US010339565B2

(12) United States Patent
Argue et al.

(10) Patent No.: US 10,339,565 B2
(45) Date of Patent: Jul. 2, 2019

(54) PRESENTING ADVERTISEMENT CONTENT DURING SEARCHES OF DIGITAL RECEIPTS

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 504 days.

(21) Appl. No.: 14/319,836

(22) Filed: Jun. 30, 2014

(65) Prior Publication Data
US 2015/0379570 A1    Dec. 31, 2015

(51) Int. Cl.
G06Q 30/02    (2012.01)
G06Q 20/04    (2012.01)

(52) U.S. Cl.
CPC ..... *G06Q 30/0256* (2013.01); *G06Q 20/0453* (2013.01)

(58) Field of Classification Search
None
See application file for complete search history.

(56) References Cited

U.S. PATENT DOCUMENTS

| | | |
|---|---|---|
| 6,341,353 B1 | 1/2002 | Herman |
| 6,975,856 B2 | 12/2005 | Ogasawara |
| 7,188,154 B2 | 3/2007 | Minowa |
| 7,219,070 B2 | 5/2007 | Antonello |
| 8,321,556 B1 | 11/2012 | Chatterjee |
| 8,452,646 B2 | 5/2013 | Levi |
| 8,468,064 B1 | 6/2013 | Trandal |
| 8,583,504 B2 | 11/2013 | Hirson |
| 2002/0091571 A1 | 7/2002 | Thomas |
| 2004/0117261 A1 | 6/2004 | Walker |
| 2006/0004627 A1 | 1/2006 | Baluja |

(Continued)

FOREIGN PATENT DOCUMENTS

WO    WO2001077934 A1    10/2001

OTHER PUBLICATIONS

Russel-Rose, Tony. Designing Search: Entering the Query. UX Magazine, Article No. 804, Mar. 14, 2012. [online] [retrieved on May 8, 2018]. Retrieved from the Internet <URL: https://uxmag.com/articles/designing-search-entering-the-query>.*

*Primary Examiner* — Michael W Schmucker
*Assistant Examiner* — Bion A Shelden
(74) *Attorney, Agent, or Firm* — Bryan Cave Leighton Paisner LLP

(57) ABSTRACT

The present invention extends to methods, systems, and computer program products for presenting advertising content during searches of digital receipts. Advertising content can be presented at a user interface used to search digital receipts. During character by character input of a search term, input characters are detected as entered. Prior to completely entering the search term, detected characters can be transmitted from a customer device to an advertising system. The advertising system can match the characters to one or more advertisements. The advertising system can return the one or more advertisements back to the customer device. The customer device can present the one or more advertisements at the user interface.

20 Claims, 7 Drawing Sheets

(56) References Cited

U.S. PATENT DOCUMENTS

| | | | |
|---|---|---|---|
| 2007/0162340 A1 | 7/2007 | Spinoso | |
| 2007/0203792 A1 | 8/2007 | Rao | |
| 2008/0189179 A1* | 8/2008 | Marouani | G06Q 30/02 |
| | | | 705/14.54 |
| 2008/0221982 A1 | 9/2008 | Harkins | |
| 2009/0271322 A1 | 10/2009 | Lay | |
| 2010/0185504 A1 | 7/2010 | Rajan | |
| 2011/0029403 A1* | 2/2011 | Xu | G06Q 30/00 |
| | | | 705/26.7 |
| 2011/0125561 A1 | 5/2011 | Marcus | |
| 2012/0047025 A1* | 2/2012 | Strohman | G06F 17/3064 |
| | | | 705/14.71 |
| 2012/0290609 A1* | 11/2012 | Britt | G06Q 30/06 |
| | | | 707/769 |
| 2013/0173398 A1* | 7/2013 | Wang | G06Q 30/0256 |
| | | | 705/14.73 |
| 2013/0211900 A1* | 8/2013 | Dessert | G06Q 10/06 |
| | | | 705/14.27 |
| 2013/0232167 A1* | 9/2013 | Vidra | G06Q 30/0251 |
| | | | 707/769 |
| 2014/0105508 A1* | 4/2014 | Arora | G06K 9/72 |
| | | | 382/218 |
| 2014/0180806 A1* | 6/2014 | Boal | G06Q 30/0245 |
| | | | 705/14.53 |

* cited by examiner

PRESENTING ADVERTISEMENT CONTENT DURING SEARCHES OF DIGITAL RECEIPTS

CROSS-REFERENCE TO RELATED APPLICATIONS

Not applicable.

BACKGROUND

1. Field of the Invention

This invention relates generally to the field of electronic sales transactions, and, more particularly, to presenting advertising content during searches of digital receipts.

2. Related Art

In a variety of transactions, consumers or buyers of goods or services typically receive receipts from their respective merchants or service providers as proof of existence of conducted transactions. Generally, receipts are issued by merchants and service providers for a number of reasons including, for example, regulatory or tax reasons and convenience purposes. A receipt provides information about a corresponding transaction for the purpose of providing all participants with a trace or record of the transaction. Receipts can later be used by a consumer for various purposes including, for example, proving participation in a transaction for tax reporting purpose, product returns, use as a claim ticket for a further transaction, provisioning warranties, etc. Depending on a variety of factors, such as, for example, items being purchased, business or personal purchase, amount of purchase, etc., a consumer may desire an electronic receipt and/or a paper receipt.

For in-store purchases, consumers generally obtain a paper receipt at the point-of-sale. However, some point-of-sale systems also support the delivery of digital receipts at the point-of-sale. Further, for telephone or online purchases digital receipts are typically delivered to a customer.

However, receipt delivery mechanisms are somewhat rigid and may not allow a merchant much, if any, flexibility in configuring the presentation of digital receipts and/or presenting supplemental information along with digital receipts. For example, a conventional point-of-sale ("POS") system typically includes a POS terminal, one or more peripheral devices (display monitor, receipt printer, barcode scanner, weigh scale, electronic signature pad) and a payment processor with pin pad (for credit and debit cards). The data for sales transactions is usually stored in a storage device at the POS terminal, which may be uploaded to one of the remote transaction authorization server or another remote server of the credit/debit card companies. Thus, although POS systems are well equipped for merchants to monitor and collect transaction data from the POS system, the format and content of the digital receipts is often pre-determined by the POS system.

As such, digital receipts may be in a pre-configured format that is not adjustable. For example, digital receipts can be images of paper receipts that are provided to a customer at the POS system. The digital receipts can include a store identifier, a receipt identifier, a date and time of purchase, and various receipt items having item identifiers and item information. The receipt items are typically listed sequentially based on their scan order (i.e., the order the cashier scanned the items). Since the digital receipt is an image file, a customer is limited to viewing receipt items in the same sequential order.

Some POS systems may be capable of generating digital receipts as separate digital data. However, POS systems are typically sold with a proprietary on-board software system that may be specific to the merchant's business. The merchant is able to make minor programming adjustments to add discount codes and other special offers, but has limited ability to add more complex functionality to the POS system.

BRIEF DESCRIPTION OF THE DRAWINGS

The specific features, aspects and advantages of the present invention will become better understood with regard to the following description and accompanying drawings where.

DETAILED DESCRIPTION

Figure 1:
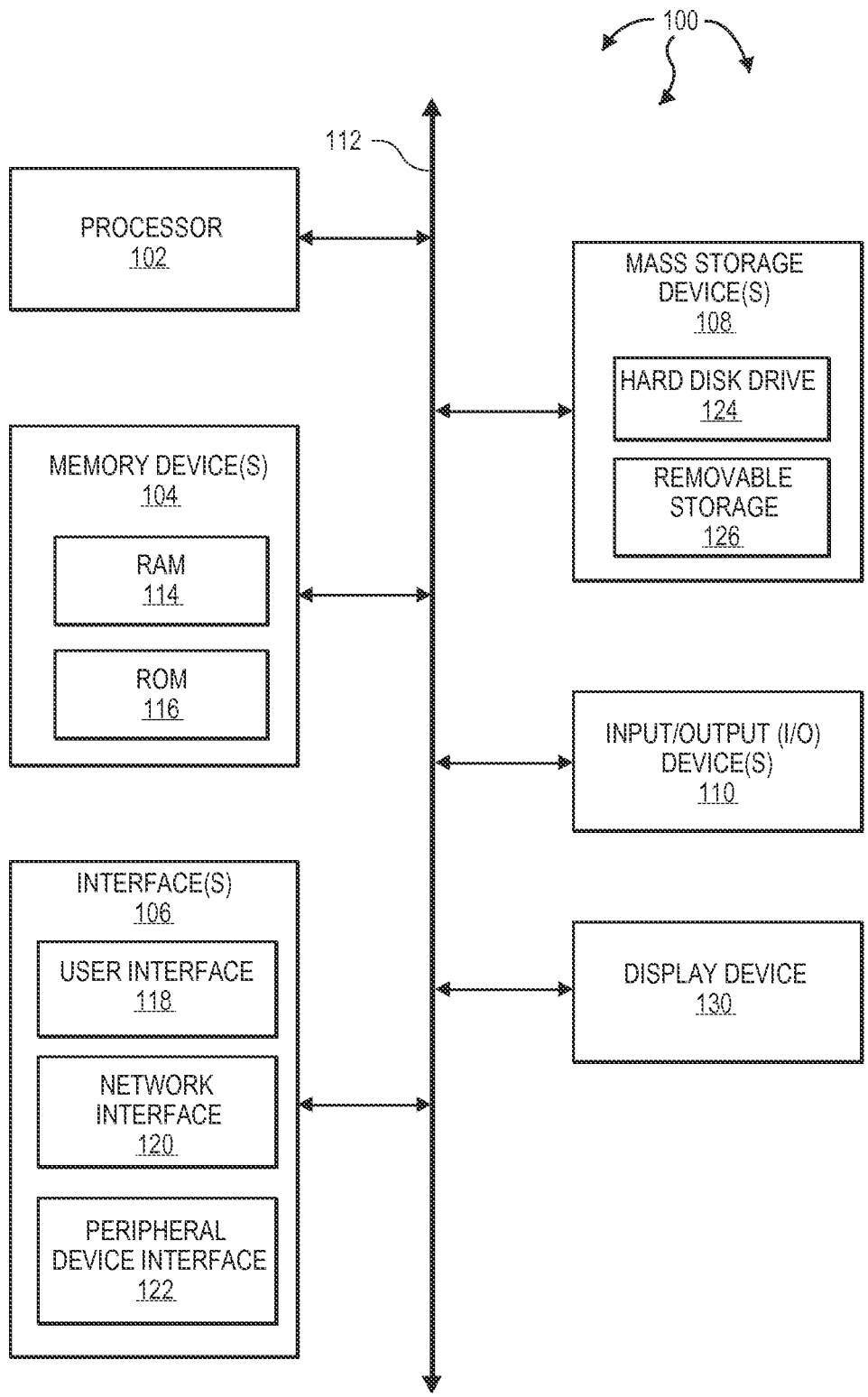
FIG. 1 illustrates an example block diagram of a computing device.

The present invention extends to methods, systems, and computer program products for presenting advertising content during searches of digital receipts. In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

It is further noted that, where feasible, functions described herein can be performed in one or more of: hardware, software, firmware, digital components, or analog components. For example, one or more application specific integrated circuits ("ASICs") can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Embodiments of the invention are directed to presenting advertising content during searches of digital receipts. As a customer participates in transactions with a merchant, a digital receipt for each transaction can be provided to the customer and also stored for later access. For example, when a sales transaction completes, a Point-Of-Sale ("POS") system can send digital receipt data to a receipt database server. The receipt database server can formulate a digital receipt for the sales transaction from the digital receipt data. The receipt database server can store the digital receipt. A customer can then use a customer device (e.g., a mobile phone) to view their digital receipts.

A customer can also search through the content of their stored digital receipts using a customer device to look for particular items, dates of purchase, forms of payment, etc. For example, a customer may user his or her mobile phone to search digital receipts to see how many times he or she purchased a particular item in the last six months. As such, a customer device can include a search module with a user-interface. The search module can be used to submit searches to the receipt database server. The search module can include an input user-interface control for receiving user input (e.g., a text box) and an activation user-interface control for activating a search (e.g., a button).

To perform a search, a customer enters a search term(s) into the input user-interface control, such as, for example, character by character or by pasting in from a buffer. When the customer is satisfied with the search term(s), the user can select the activation user-interface control. In response to detecting selection of the activation user-interface control, the search module can send the search term(s) to the receipt database server. The receipt database server can receive the search term(s) from the search module. The receipt database server then attempts to match the search term(s) to content (e.g., receipt items) in the customer's digital receipts. When matches are identified, the receipt database server can return the matches (e.g., the receipt items) back to the customer device.

Through the search module use-interface, advertising content can also be presented at a customer device. During character by character input of a search term at the input user-interface control, input characters can be automatically detected as they are entered (and prior to selection of the activation user-interface control). Detected characters can be transmitted from the customer device to an advertising system (which may or may not be under common control along with the receipt database server).

The advertising system can receive the detected characters from the customer device. The advertising system can match the characters to one or more advertisements. The advertising system can return the one or more advertisements back to the customer device. The customer device can present the one or more advertisements at the search module user-interface along with the input user-interface control and the activation user-interface control. Advertisers (e.g., product manufacturers) can pay the merchant or the owner of the advertising system to have their advertisements matched to specified characters or combinations of characters.

In some embodiments, a search module sends one or more characters to an advertising system when relevant search results (e.g., receipt items) based on the one or more characters are unlikely. For example, one or more characters (such as the first character entered or the first and second characters entered) may not provide sufficient specificity for searching digital receipt content. Accordingly, the one or more characters can be sent from a customer device to the advertising system to be matched to advertisements. The advertising system can match the one or more characters to one or more advertisements and return the one or more advertisements to the customer device.

In some embodiments, the advertising system can also access the content of customers' digital receipts. To efficiently use available resources, advertisers may attempt to match their product with a customer that buys similar or related products. For example, a customer that has purchased coffee and creamer may be a candidate to receive advertisements for a coffee machine. Thus, when a user enters 'c' in at the input user-interface element, the 'c' can be automatically detected and sent to the advertising system. The advertising system can refer to the customer's digital receipts to determine that the customer has purchased coffee and creamer in the past. In response, the advertising system can attempt to match the 'c' to advertisements related to coffee and creamer. An advertisement for a coffee maker can be identified and returned to the customer device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory ("RAM") 114) and/or nonvolatile memory (e.g., read-only memory ("ROM") 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 can include any number of different network interfaces 120, such as interfaces to personal area networks ("PANs"), local area networks ("LANs"), wide area networks ("WANs"), wireless networks (e.g., near field communication ("NFC"), Bluetooth, Wi-Fi, etc. networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
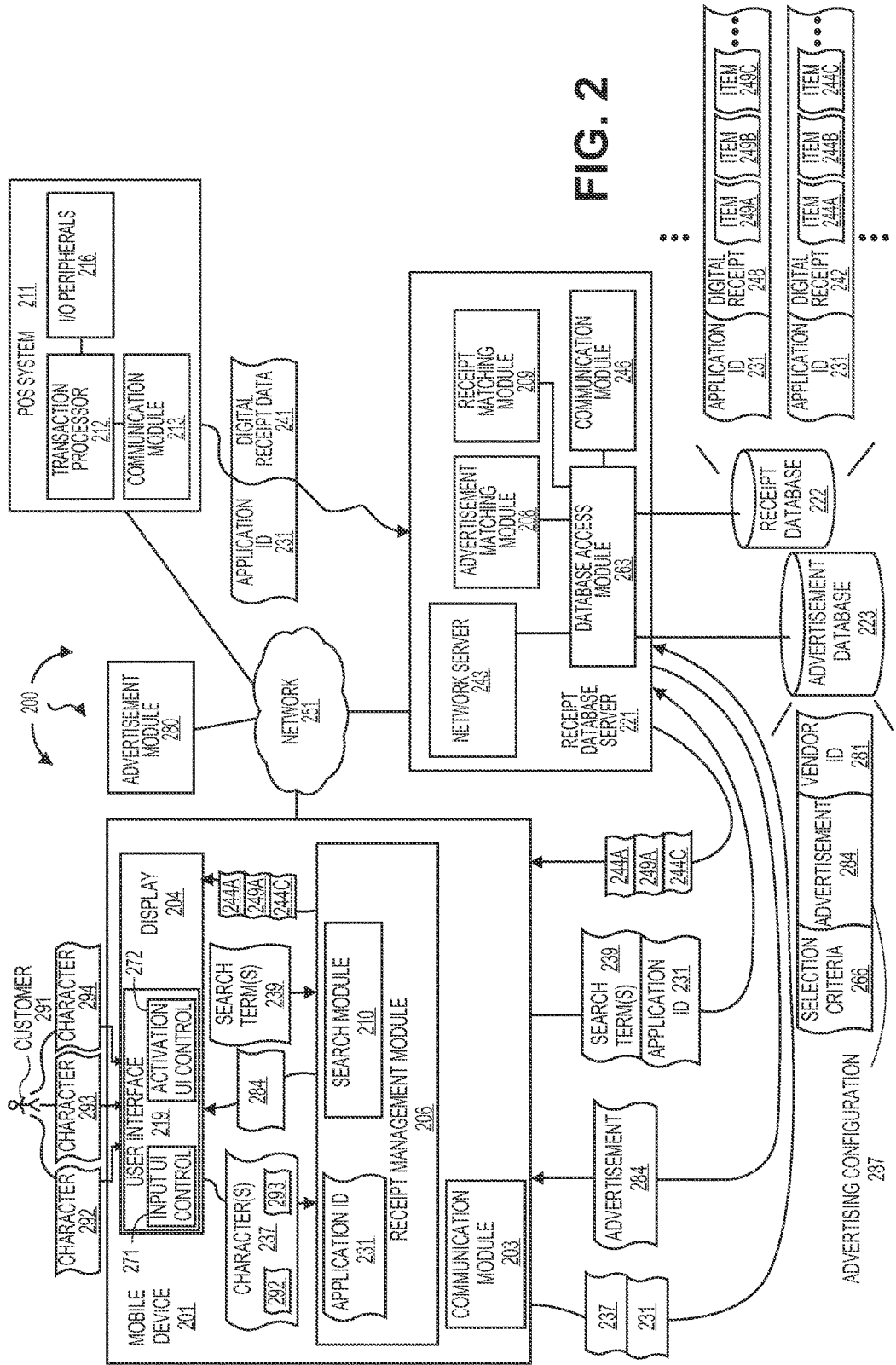
FIG. 2 illustrates an example computer architecture that facilitates presenting advertising content during searches of digital receipts.

FIG. 2 illustrates an example computer architecture 200 that facilitates presenting advertising content during searches of digital receipts. Referring to FIG. 2, computer architecture 200 includes mobile device 201, POS system 211, receipt database server 221, and advertisement module 280. Each of the depicted components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

POS system 211 includes transaction processor 212, communication module 213, and I/O peripherals 216. POS system 211 can be physically located at a checkout lane in a store. Generally, transaction processor 212 is configured to manage sales transactions for POS 211A. Transaction processor 212 can receive input from I/O peripherals 216 to open a sales transaction, collect receipt data (e.g., date, time, item, number of units, cost data, tax, department, etc.) for a sales transaction, and close a sales transaction. Receipt data for an item (e.g. item description, item cost, department, etc.) can be retrieved from an item database in response to scanning a barcode on (or otherwise identifying) the item. Other receipt data for an item (e.g., number of units, tax, etc.) can be calculated by transaction processor 212. I/O peripherals 216 can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Communication module 213 can be a wired and/or wireless network adapter for connecting POS system 211 with a network, such as, for example, a Wi-Fi and/or wired Ethernet network, that facilitates a further connection to network 251 (e.g., the Internet).

POS system 211 can be in a physical store location that is owned by an entity, such as, for example, a retailer corporation that runs a chain of stores. The chain of stores can include one or more of: grocery stores, department stores, warehouse stores, discount stores, etc. In embodiments, POS system 211 includes components in a checkout isle as well as components in a store based data center.

One of more other POS systems can also be at the physical store location. Other POS systems for the entity can also be at other physical store locations.

Receipt database server 221 includes advertisement matching module 208, receipt matching module 209, Network (e.g., Web) server 243, communication module 246, and database access module 263. Network server 243 is configured to communicate with external devices, such as, for example, mobile device 201. A common entity, such as, a retailer corporation, can own one or more physical store locations (e.g., a chain of stores) as well as receipt database server 221. Each of the one or more store physical locations can include one or more POS systems as well as other computer systems (e.g., local backend servers). Communication module 246 can be configured to communicate with POS systems as well as other computer systems at each of the one or more physical store locations (e.g., on an internal corporate network) to facilitate business operations for the entity.

Receipt database server 221 can receive application identifiers and digital receipt data from POS systems at various different store locations, including POS systems 211. For example, receipt database server 221 can receive application ID 231 along with digital receipt data 241. Receipt database server 221 can formulate digital receipts from received receipt data. Formulated digital receipts can include entries for items included in corresponding digital receipt data (but potentially in a different format, for example, a format deliverable to mobile devices).

For example, receipt database server 221 can formulate digital receipt 242, including receipt items 244A, 244B, 244C, etc., from digital receipt data 241. Receipt database server 221 can map application ID 231 to digital receipt 242. Similarly, receipt database server 221 can formulate digital receipt 248, including receipt items 249A, 249B, 249C, etc., from digital receipt data received from some other POS system along with application ID 231. Receipt database server 221 also can map application ID 231 to digital receipt 248.

Database access module 263 can store digital receipts along with application identifiers in receipt database 222. For example, database access module 262 can store digital receipts 242 and 248 along with application ID 231. The application identifiers map digital receipts to corresponding mobile devices. For example, application ID 231 can map digital receipts 242 and 248 to mobile device 201. Application identifiers can be indicated, either manually by a customer in an automated fashion by a mobile device, at the time of a transaction.

Receipt database server 221 can be part of a (e.g., regional, national, or global) backend system that receives receipt data from a plurality of POS systems distributed throughout different geographic locations and formulates corresponding digital receipts. The plurality of POS systems and the backend system can be part of a commonly owned and/or controlled corporate network infrastructure.

Subsequent to storing digital receipts, receipt database server 221 can send stored digital receipts (e.g., in a created format and/or (re)arranged to include advertising content) to customer computing devices, such as, for example, smartphones and/or tablets. Receipt database server 221 can send digital receipts to a mobile device in response to a request and/or in accordance with configured settings. For example, in response to a request for receipts from mobile device 201, receipt database server 221 can send any of digital receipts 242 and 248 or advertisement 284 to mobile device 201. Sending digital receipts from receipt database server 221 and/or advertisements from advertisement database 223 to a mobile device can involve push or polled mechanisms. Receipt database server 221 can send digital receipts and/or advertisements in a web or native view.

Advertisers can use advertisement module 280 (or a similar module) to maintain their own advertising configurations in advertisement database 223. The advertisement module 280 can be located within a purchasing department of a store or elsewhere, such as for example, at corporate location, a manufacturer location, etc. As such, an advertiser (e.g., a vendor or retailer) can log in using advertisement module 280 to access their advertising content (stored by vendor ID) stored in advertisement database 223. Advertisement module 280 can include an interface for accessing, adding, deleting, and updating advertising configurations stored in advertisement database 223. Thus, advertisers can create or update advertising content, criteria, instructions, etc. for compatibility with more general advertising campaigns. Permitting advertisers to maintain their own advertising configurations relieves an owner of POS system 211 and receipt database server 211 from having to do so.

Accordingly, receipt database server 221 can receive vendor identifiers and advertisement configuration data from advertisement module 280.

Advertising configurations can include advertisements and selection criteria. Advertisements can include textual data, pictures, other graphics, links to manufactures or vendors websites (e.g., hyperlinks), triggers to launch customer workflows within the application viewing the receipt (e.g., show coupon details or apply coupon to next shop) as well as other such advertisement information that can be associated with receipt items of one or more digital receipt. Advertisements may also include public service announcements, messages about a sports team, places to donate for a good cause and other such information. For example, if a local high school sports team is playing for a state championship, a local merchant would generally benefit from presenting a statement of support to relevant customers. An advertisement can also show a merchant's support for medical research by indicating where donations can be made cancer research, etc.

Selection criteria define when an advertisement is to be selected for presentation at a user-interface and/or along with receipt items from one or more digital receipts. Selection criteria can be configured to target advertisements to customers having an increased possibility of responding to an advertisement. Using selection criteria, a vendor can target an advertisement for product to customers who have purchased the product, similar products, related products, or competitor's products, either currently or in the past. For example, a soda manufacturer can target advertisements for soda to a user interface when digital receipts include receipt items for a variety of picnic related supplies. Other selection criteria can limit the number of advertisements allowed, consider dates for advertisement inserts, consider if a customer has opted in for receiving advertisements, consider a total purchase amount (e.g., is the total purchase price above or below a threshold), etc. Limiting the number of advertisements that can be presented so as to control costs that a manufacturer or vendor may pay for using a user-interface as an advertisement media.

Advertising configurations can be product specific and vendor provided. Other advertising configurations can be retailer lead generation advertisements. For example, "people who bought a skateboard also bought new pads". Clicking on the kneepads can show all kneepads sold by the retailer.

In some embodiments, advertisements are presented at a user-interface used to search for receipt items.

As depicted, mobile device 201 (e.g., a smartphone) includes communication module 203, display 204, and receipt management module 206. In general, receipt management module 206 provides a user of mobile device 201 with various mechanisms for managing their digital receipts. Receipt management module 206 further includes search module 210. Search module 210 is configured to search for receipt items in receipt database 222. Search module 210 can display receipt items at user-interface 219. Receipt management module 206 can also be used to pair customer application ID 231 (e.g., derived from a loyalty number, a telephone number, a portion of a credit card number, etc.) with mobile device 201. As such, receipt items corresponding to application ID 231 can be delivered to mobile device 201.

Receipt management module 206 can present user-interface 219 at display 204 (e.g., a general purpose display device). User-interface 219 can include (e.g., touch screen) user-interface controls allowing a user to interact with digital receipt content (e.g., receipt items, advertisements, etc.) For example, customer 291 can enter input to search receipt database 222 for specified receipt items. Various receipt items can be returned from receipt database 222 back to mobile device 201.

Communication module 203 can be a wireless network adapter for connecting mobile device 201 with a wireless network, such as, for example, Wi-Fi and/or a cellular network (e.g., CDMA, GSM, iDen, etc.) that facilitates a further connection to network 251 (e.g., the Internet)

In some embodiments, customer 291 manually enters a search term character by character at UI input control 271 using an input device, such as, for example, a keyboard or a virtual keyboard. During character by character input of the search term, input characters (e.g., the first input character or first and second input characters) can be automatically detected as they are entered (and prior to selection of the activation UI control 272). Detected characters can be transmitted from mobile device to advertising matching module 208 (which may or may not be under common control receipt matching module 209).

Matching module 208 can receive the detected input characters from mobile device 201. Matching module 208 can match the characters to one or more advertisements. Matching module 208 can return the one or more advertisements back to mobile device 201. Mobile device 201 can present the one or more advertisements at user interface 219. Advertisements can be presented at user interface 219 while customer 291 continues to enter additional character by character input. Advertisers (e.g., product manufacturers) can pay the merchant or the owner of the advertisement matching module 208 to have their advertisements matched to specified characters or combinations of characters.

In some embodiments, search module 210 sends one or more characters to advertisement matching module when relevant search results (e.g., receipt items) based on the one or more characters are unlikely. For example, one or more characters (such as the first character entered or the first and second characters entered) may not provide sufficient specificity for searching receipt items in receipt database 222. Accordingly, the one or more characters can be sent from mobile device 201 to advertisement matching module 208 to be matched to advertisements in advertisement database 223. Matching module 208 can match the one or more characters to one or more advertisements and return the one or more advertisements to mobile device 201.

Customer 291 can eventually enter enough characters of a desired search term at input UI control 271 that relevant search results are more likely. When customer 291 has completed character by character input, customer 291 can select activation UI control 272. Selection of activation UI control 272 causes search module 210 to send the entire contents of input UI control to receipt matching module 209. Receipt matching module 209 can matching entered search term(s) to receipt items in receipt database 222. Receipt matching module can return matching receipt items back to mobile device 201.

Figure 3:
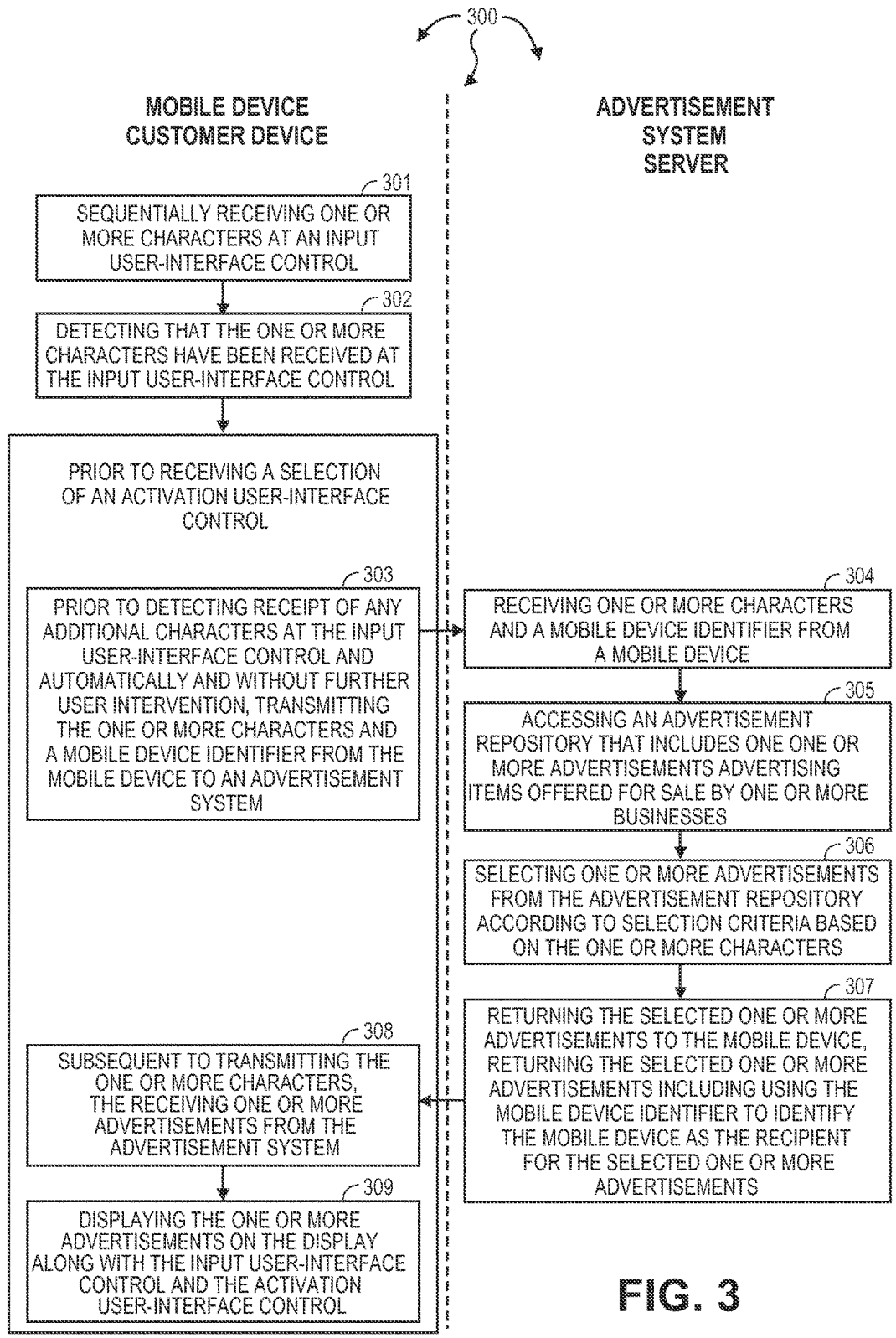
FIG. 3 illustrates a flow chart of an example method for presenting advertising content during searches of digital receipts.

FIG. 3 illustrates a flow chart of an example method 300 for presenting advertising content during searches of digital receipts. Method 300 will be described with respect to the components and data in computer architecture 200.

In general, method 300 can be used to present advertisements at a search interface used to search for receipt items.

Method 300 includes sequentially receiving one or more characters at the input user-interface control (301). For example, mobile device 201 can receive character 292 and then character 293 from customer 291 at input UI control 271. Method 300 includes detecting that the one or more characters have been received at the input user-interface control (302). For example, search module 210 can detect that character 292 and then character 293 have been received at input UI control 271.

User-interface 272 can group character 292 and character 293 as characters 237.

Prior to receiving a selection of the activation user-interface control, prior to detecting receipt of any additional characters at the input user-interface control, and automatically and without further user intervention, transmitting the one or more characters and a mobile device identifier from the mobile device to an advertisement system (303). For example, prior to customer 291 selecting activation UI control 272 and prior to receiving any characters after character 293, search module 210 can automatically transmit characters 237 along with application ID 231 to advertisement matching module 208.

Method 300 includes receiving one or more characters and a mobile device identifier from a mobile device (304). For example, advertisement matching module 208 can receive characters 237 along with application ID 231 from mobile device 201. Method 300 includes accessing an advertisement repository that includes one or more advertisements, the one or more advertisements advertising items offered for sale by one or more businesses (305). For example, advertisement matching module 208 can access advertisement database 223.

Method 300 includes selecting one or more advertisements from the advertisement repository according to selection criteria based on the one or more characters (306). For example, advertisement matching module 208 can select advertisement 284 according to selection criteria 266 based on characters 237. Method 300 includes returning the selected one or more advertisements to the mobile device, returning the selected one or more advertisements including using the mobile device identifier to identify the mobile device as the recipient for the selected one or more advertisements (307). For example, advertisement matching module 208 can return advertisement 284 to mobile device 201. Advertisement matching module 208 can used application ID 231 to identify mobile device 201 as the recipient for advertisement 284.

Method 300 includes prior to receiving a selection of the activation user-interface control and subsequent to transmitting the one or more characters, receiving one or more advertisements from the advertisement system (308). For example, mobile device 201 can receive advertisement 284 from advertisement matching module 208 prior to customer 291 selecting activation UI control 272 and subsequent to transmitting characters 237. Method 300 includes displaying the one or more advertisements on the display along with the input user-interface control and the activation user-interface control (309). For example, user interface 291 can display advertisement 284 along with input UI control 271 and activation UI control 272 at display 204.

During and/or subsequent to presentation of advertisement 284, customer 291 can enter remaining characters of a receipt item search term at input UI control 271 and select activation UI control 272 (collectively represented by input 294). For example, subsequent to entering characters 292 and 293, customer 291 can enter remaining characters for search term(s) 239 at inputs UI control 271. Customer 291 can then select activation UI control 272. Search module 210 can detect that activation UI control 272 has been selected.

In response to detecting selection of activation UI control 272, search module 210 can send search terms(s) 239 along with application ID 231 to receipt matching module 209. Receipt matching module 209 can identify receipt items corresponding to application ID 231 and that match search term(s) 239. For example, receipt matching module 209 can identify receipt items 244A, 249A, and 244C as matching search term(s) 239. Receipt matching module 209 can return receipt items 244A, 249A, and 244C to mobile device 201.

Mobile device 201 can present receipt items 244A, 249A, and 244C at user interface 219.

Presented advertisements may or may not be relevant to presented receipt items.

Figure 4A:
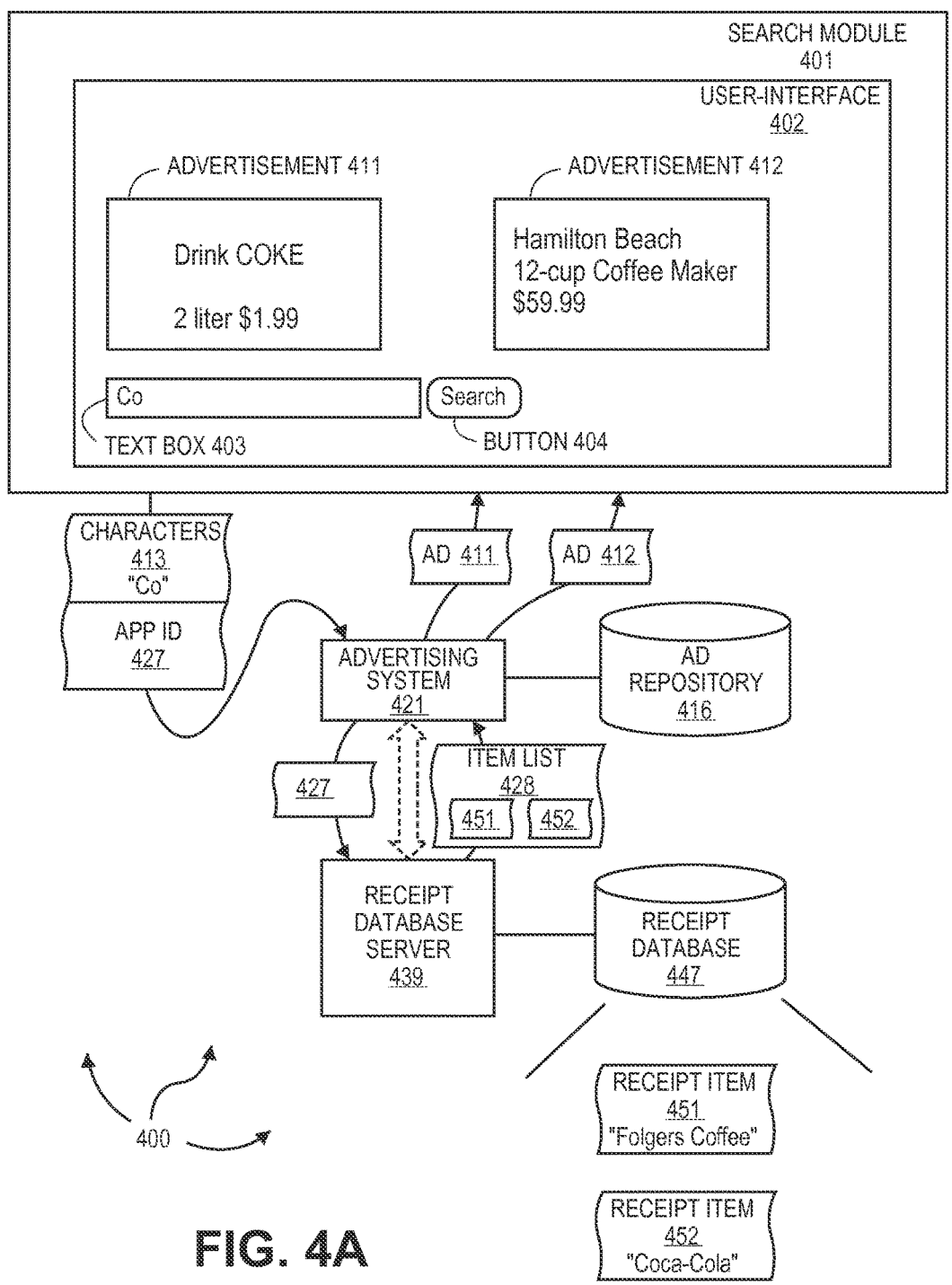
FIGS. 4A and 4B illustrate an example of a digital receipt search interface interacting with an advertising system to present advertising content.

Turning to FIG. 4A, FIG. 4A illustrates an example of a digital receipt search interface 402 interacting with an advertising system 521 to present advertising content. As depicted, search module 401 includes user-interface 402. User-interface 402 further includes text box 403 and button 404. A mobile device user can enter "Co" into text box 403. Characters 413 "Co" and app ID 427 (an application ID for a mobile device) can send to advertising system 421. Advertising system 421 can send app ID 427 to receipt database server 439 to request receipt items corresponding to app ID 427.

Receipt database server 439 can identify item list 428, including receipt items 451 "Folgers Coffee" and receipt item 452 "Coca-Cola", corresponding to app ID 427. Receipt database server 439 can return item list 428 to advertising system 421. Advertising system 421 can use characters 413 and item list 428 to identify AD 411 and AD 412. Owners of the products advertised in AD 411 and AD 412 (or their representatives) can pay for the right to present advertisements for the combination of letters "Co". As such, advertising system 421 can return AD 411 and AD 412 to search module 401. AD 411 and AD 412 can be presented at user-interface 402.

Figure 4B:
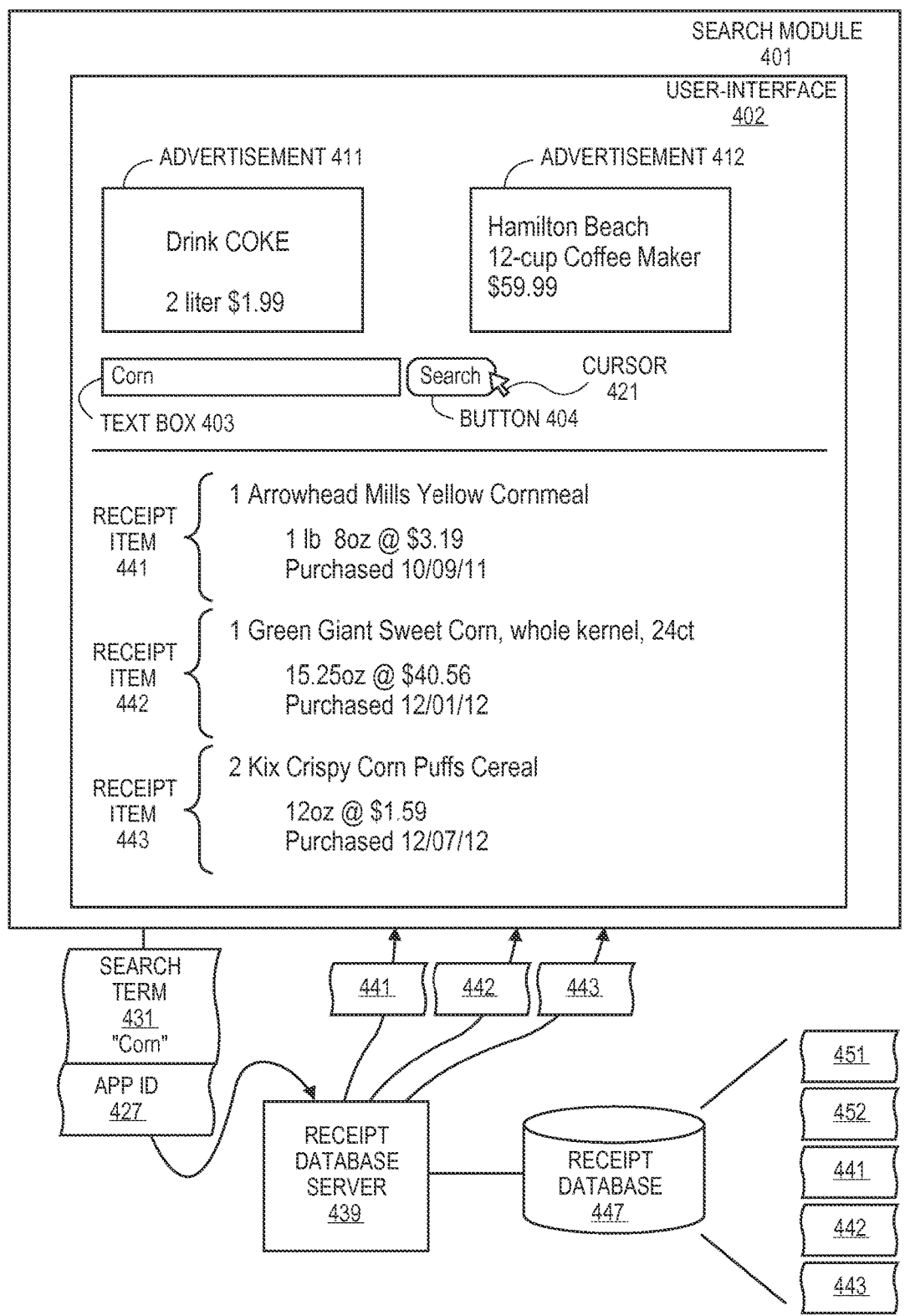

During and/or after presentation of AD 411 and AD 412, a mobile device user can continue to enter characters into text box 403. For example, turning to FIG. 4B, a mobile device user can continuing entering characters to spell the word "Corn". Subsequently, the mobile device user can select button 404 with cursor 421. In response to selection of button 404, search module 401 can submit search term 431 "Corn" along with app ID 427 to receipt database server 439.

In response, receipt database server 439 can search receipt database 447 for receipt items corresponding to app ID 427 and that match (or are at least relevant to) search term 431 "Corn". Receipt database server 439 can determine that receipt items 441, 442, and 443 match (or are at least relevant to) search term 431 and corresponding to app ID 427. As such, receipt database server 439 can return receipt items 441, 442, and 443 to search module 401. As depicted, receipt items 441, 442, and 443 can be presented at user-interface 402 along with AD 411 and AD 412.

Figure 5:
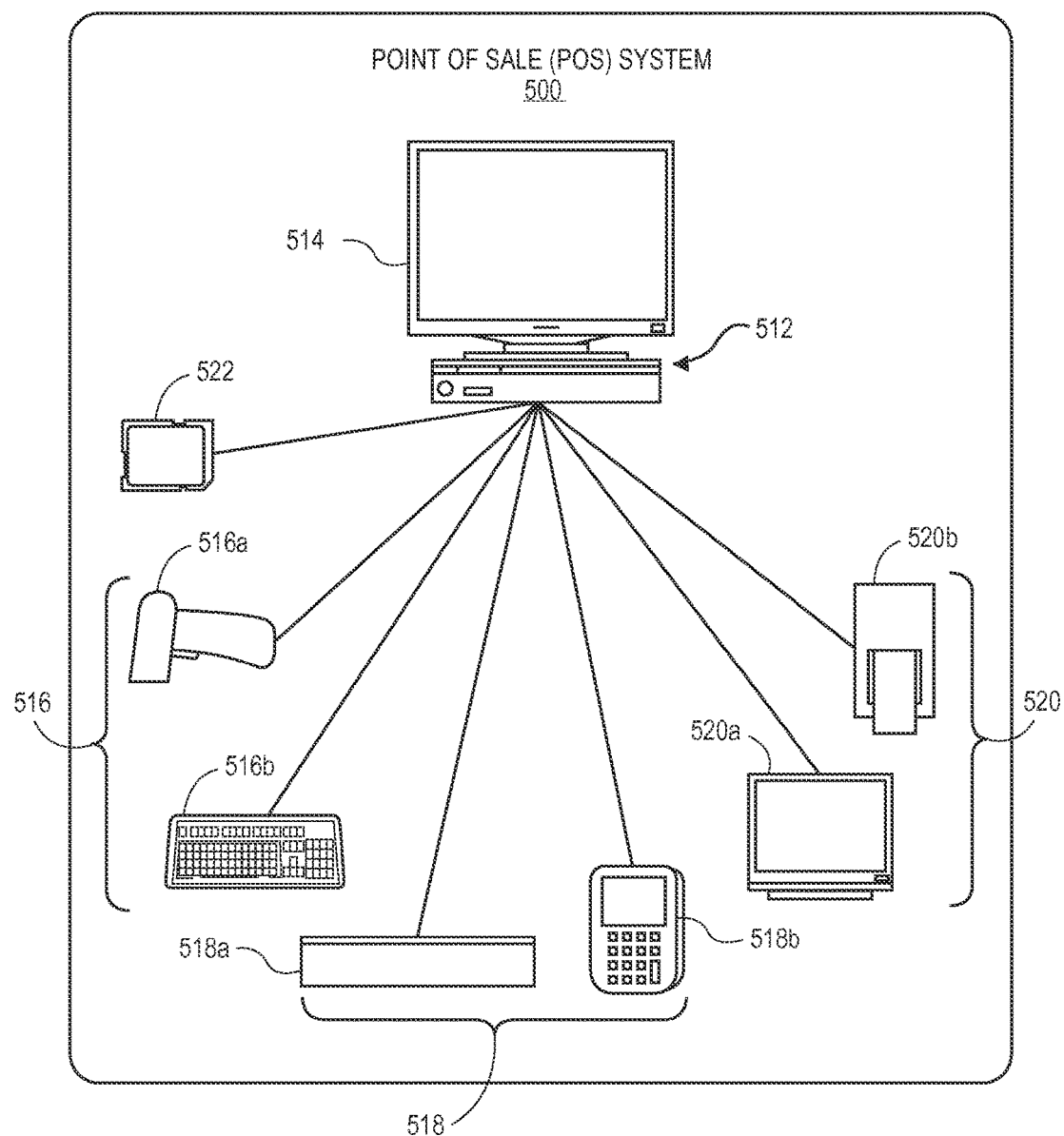
FIG. 5 illustrates an example schematic block diagram of a point-of-sale ("POS") system that creates digital receipts.

Turning to FIG. 5, FIG. 5 illustrates an example schematic block diagram of a point-of-sale (POS) system 500. In some embodiments, the hardware, software, or hardware and software of POS system 500 may be configured to implement one or more methods in accordance with the present invention. For example, POS system 500 may be manufactured, programmed, modified, or upgraded to support creating and sending digital receipt data to receipt database server 221. POS system 211 can be a POS system similar to POS system 500.

POS system 500 can include various components. In some embodiments, POS system 500 includes a central or primary computer 512, a monitor 514 (e.g., a cashier-facing monitor 514), one or more input devices 516 (e.g., scanners 516a, keyboards 516b, scales, or the like), one or more payment devices 518 (e.g., cash drawers 518a, card readers 518b) for receiving or returning payments, one or more output devices 520 (e.g., customer-facing display 520a or monitor 520a, receipt printer 520b), or the like or combinations or sub-combinations thereof, and NFC module 522, such as, for example, an NFC dongle.

Computer 512 may form the backbone of POS system 500. Other components 516, 518, 520, 522 forming part of a POS system 500 can communicate with computer 512. Input devices 516 and certain payment devices 518 can feed data and commands to computer 512 for processing or implementation. For example, scanner 516a can pass data communicating the identity of one or more items to be purchased, returned, or the like to a computer 512. Similarly, card reader 718b can pass payment information to computer 512.

On the other hand, output devices 520 and certain payment devices 518 can follow or implement commands issued by computer 512. For example, cash drawer 518a may open in accordance with the commands of computer 512. Similarly, customer-facing display 520a and receipt printer 520b can display or output data or information as instructed by computer 512.

In some embodiments, in addition to handling consumer transactions (e.g., purchases, returns), POS system 500 can provide or support certain "back office" functionality. For example, POS system 500 can provide or support inventory control, purchasing, receiving and transferring products, or the like. POS system 500 can also store sales and customer information for reporting purposes, marketing purposes, receivables management, trend analysis, cost analysis, price analysis, profit analysis, or the like. If desired or necessary, POS system 500 can include an accounting interface to pass certain information to one or more in-house or independent accounting applications.

Figure 6:
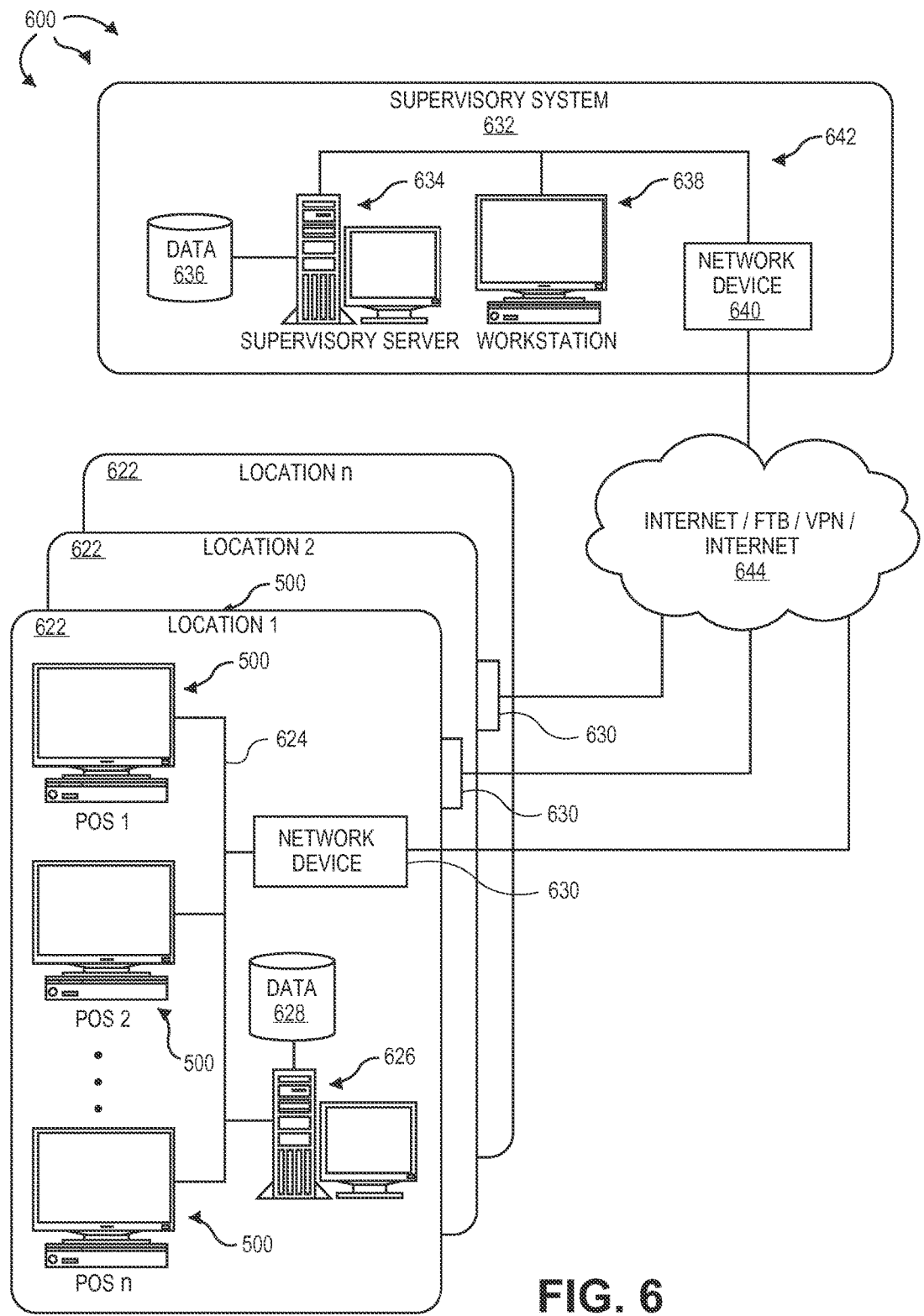
FIG. 6 illustrates an example schematic block diagram of a network of point-of-sale ("POS") systems that creates digital receipts.

In some embodiments, POS system 500 operates substantially independently, as a stand-alone unit. Alternately, POS system 500 may be one of several POS systems 500 forming the front line of a larger system. FIG. 6 illustrates an example schematic block diagram of a network 600 of point-of-sale (POS) systems 500. For example, multiple POS systems 600 may operate at a particular location 622 (e.g., within a retail, brick-and-mortar store). In such embodiments, the various POS systems 500 may be interconnected via LAN 624. LAN 624 may also connect the POS systems 500 to a local server 626.

Local server 626 can support the operation of the associated POS systems 500. For example, a server 626 may provide a central repository from which certain data needed by the associated POS systems 500 may be stored, indexed, accessed, or the like. Server 626 can serve certain software to one or more POS systems 500. In certain embodiments, a POS system 500 can offload certain tasks, computations, verifications, or the like to server 626.

Alternatively, or in addition thereto, server 626 can support certain back office functionality. For example, server 626 can receive and compile (e.g., within an associated database 828) data from the various associated POS systems 500 to provide or support inventory control, purchasing, receiving and transferring products, or the like. Server 626 can also receive and compile sales and customer information for reporting purposes, marketing purposes, receivables management, trend analysis, cost analysis, price analysis, profit analysis, or the like.

In some embodiments, one or more POS systems 500 and/or servers 626 corresponding to a particular location 622 can communicate with or access one or more remote computers or resources via one or more network devices 630. For example, a network device 630 can enable a POS system 500 to contact outside resources and verify the payment credentials (e.g., credit card information) provided by a customer. A network device 630 can comprise a modem, router, or the like.

In selected embodiments, POS systems 500 operate within an enterprise-wide system 631 comprising multiple locations 622 (e.g., branches 622 or stores 622). In such embodiments, each location 622 may have one or more POS systems 500, local servers 626, local databases 628, network devices 630, or the like or combinations or sub-combinations thereof connected by a computer network (e.g., a LAN 624). Any of local servers 626 can include the functionality receipt database server 221. Thus, any of local servers 626 can be configured to arrange advertising content in digital receipts.

Additionally, each such location 622 may be configured to interact with one or more supervisory systems 632. For example, multiple branch locations 622 may report to an associated "headquarters" location or system.

A supervisory system 632 can include one or more supervisory servers 634, databases 636, workstations 638, network devices 640, or the like or combinations or sub-combinations thereof. The various components of a supervisory system 632 can be interconnected via a computer network (e.g., a LAN 642). In selected embodiments, a supervisory system 632 includes one or more supervisory servers 634 providing a central repository from which certain data needed by the one or more POS systems 500 or local servers 626 may be stored, indexed, accessed, or the like. Any of supervisory servers 634 can include the functionality receipt database server 221. Thus, any of supervisory servers 634 can be configured to arrange advertising content in digital receipts.

Alternatively, or in addition thereto, a supervisory server 634 can receive and compile (e.g., within an associated database 636) data from the various associated POS systems 500 or local servers 626 to provide or support inventory control, purchasing, receiving and transferring products, or the like. A supervisory server 634 may also receive and compile sales and customer information for reporting purposes, marketing purposes, receivables management, trend analysis, cost analysis, price analysis, profit analysis, or the like.

A supervisory system 632 can be connected to one or more associated locations 622 or branches 622 in via any suitable computer network 644 (e.g., WAN 644). For example, in selected embodiments, one or more locations 622 can connect to a supervisor system 632 via the Internet. Communication over such a network 644 can follow any suitable protocol or security scheme. For example, communication may utilize the File Transfer Protocol (FTP), a virtual private network (VPN), intranet, or the like.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:
1. A method comprising:
   prior to initiating a search by a customer for one or more digital receipts of the customer:
      receiving, by a computer system using one or more processors, a request to search the one or more digital receipts from a mobile device of the customer, wherein the mobile device comprises:
a search engine for searching content of the one or more digital receipts from previous purchases made by the customer, wherein:
the content of each digital receipt of the one or more digital receipts comprises one or more receipt items, wherein the each digital receipt of the one or more digital receipts are stored in a receipt database server located apart from the mobile device;
the search engine comprises a graphical user-interface on the mobile device, wherein the graphical user-interface comprises an input user-interface control and an activation user-interface control;
the input user-interface control receives characters of one or more search terms of the request; and
the activation user-interface control activates the search engine to search for the content of the each digital receipt based on at least one search term of the one or more search terms of the request, wherein the mobile device communicates with the receipt database server and an advertisement system;
at the receipt database server:
searching, by the receipt database server, the one or more digital receipts for products previously purchased in association with the mobile device, by using one or more application identifiers mapping one or more of the one or more digital receipts to corresponding mobile devices, wherein the products correspond to one or more advertisements that match the characters of the at least one search term, wherein the one or more application identifiers are received from one or more Point of Sale ("POS") systems by the receipt database server, wherein the receipt database server communicates with the one or more POS systems;
sequentially receiving, by the receipt database server from the graphical user-interface of the mobile device of the customer, the characters of the at least one search term at the input user-interface control until the at least one search term is completed;
detecting, by the receipt database server, that the characters of the at least one search term have been received at the input user-interface control;
after receiving a selection of the activation user-interface control, transmitting the at least one search term to a receipt matching system, wherein the at least one search term is matched to a particular receipt item retrieved from one or more of the each digital receipt of the one or more digital receipts that list the particular receipt item, wherein the one or more receipt items comprise the particular receipt item; and
receiving, by the receipt database server, a list of receipt items comprising the particular receipt item from the one or more digital receipts that matches the one or more application identifiers mapped to the mobile device of the customer, wherein the list of receipt items identifying the particular receipt item corresponds to the characters of the at least one search term, as completely entered, wherein the receipt database server communicates with the advertisement system;

at the advertisement system prior to receiving the selection of the activation user-interface control:
sequentially receiving, by the receipt database server, the characters of the at least one search term by the input user-interface control;
prior to detecting receipt of any additional characters of the at least one search term at the input user-interface control and automatically and without further customer intervention, transmitting to the advertisement system the characters of the at least one search term and an application identifier of the one or more application identifiers mapped to the mobile device, wherein (a) the characters of the at least one search term are matched to the one or more advertisements from the advertisement system based on the content of the one or more digital receipts of the customer, and (b) the application identifier mapped to the mobile device identifies the mobile device to the advertisement system;
verifying, by the advertisement system, the each digital receipt of the one or more digital receipts that corresponds to the one or more advertisements and to the application identifier;
retrieving, by the advertisement system, the each digital receipt from the receipt database server storing the one or more digital receipts of the customer;
searching, by the advertisement system, the each digital receipt for the products previously purchased in association with the mobile device that correspond to the one or more advertisements that match the characters of the at least one search term; and
responsive to the searching of the each digital receipt for the products previously purchased, receiving, by the advertisement system, the one or more advertisements advertising items offered for sale, wherein the one or more advertisements are selected based on:
the characters of the at least one search term;
the list of receipt items; and
the products similar or related to the list of receipt items;
presenting, by the advertisement system, the one or more advertisements on the graphical user-interface of the mobile device of the customer prior to receiving the selection of the activation user-interface control, wherein the advertisement system communicates with the mobile device of the customer; and
displaying by the receipt database server, the particular receipt item of the list of receipt items and a date of purchase of the particular receipt item identifying one or more of the products that correspond to the characters of the at least one search term, as completely entered, with the one or more advertisements previously presented on the graphical user-interface of the mobile device of the customer.

2. The method of claim 1, wherein, the particular receipt item of the list of receipt items has an item name, an item identifier, an item price, and an item department, and an item date of purchase.

3. The method of claim 2, wherein sequentially receiving, by the receipt database server from the graphical user-interface of the mobile device of the customer, the characters of the at least one search term comprises receiving a single character of the at least one search term; and
wherein detecting that the characters of the at least one search term have been received at the input user-interface control comprises detecting that the single character of the at least one search term has been received at the input user-interface control.

4. The method of claim 3, wherein transmitting to the advertisement system the characters of the at least one search term and the application identifier of the one or more application identifiers mapped to the mobile device further comprises transmitting the single character of the at least one search term to the advertisement system; and wherein receiving, by the advertisement system, the one or more advertisements comprises receiving each advertisement in the one or more advertisements associated with a product name having the single character of the at least one search term as a first letter of the product name.

5. The method of claim 1, wherein sequentially receiving, by the receipt database server, the characters of the at least one search term further comprises sequentially receiving a first character and a second character of the at least one search term; and wherein detecting that the characters of the at least one search term have been received at the input user-interface control comprises detecting that the first character and the second character of the at least one search term have been received at the input user-interface control.

6. The method of claim 5, wherein transmitting to the advertisement system the characters of the at least one search term and the application identifier of the one or more application identifiers mapped to the mobile device further comprises transmitting the first character and the second character of the at least one search term to the advertisement system; and wherein receiving, by the advertisement system, the one or more advertisements comprises receiving each advertisement in the one or more advertisements associated with a product name having the first character and the second character of the at least one search term as a first letter and a second letter, respectively, of the product name.

7. The method of claim 1, further comprising:

subsequent to sequentially receiving, by the receipt database server, the characters of the at least one search term, sequentially receiving additional characters of the at least one search term, wherein receiving the selection of the activation user-interface control occurs after sequentially receiving the additional characters of the at least one search term; and in response to receiving the selection of the activation user-interface control, submitting the characters of the at least one search term and the additional characters of the at least one search term together to the receipt database server, the receipt database server storing the content of the one or more digital receipts of the customer.

8. At a computer system, a method for locating advertisements relevant to a character string, the character string comprising characters of at least one search term, the method comprising:

prior to initiating a search activated by a customer for one or more digital receipts of the customer:

receiving, by the computer system, a request to search content of the one or more digital receipts from a mobile device of the customer;

receiving, by a receipt database server, the characters of the at least one search term at an input user-interface control until the at least one search term is completed from a graphical user-interface of the mobile device and an application identifier mapped to the mobile device of the customer;

searching, by the receipt database server, the one or more digital receipts for products previously purchased in association with the mobile device, by using one or more application identifiers mapping one or more of the one or more digital receipts to corresponding mobile devices, wherein the products correspond to one or more advertisements that match the characters of the at least one search term, wherein the one or more application identifiers are received from one or more Point of Sale ("POS") systems, wherein the receipt database server communicates with the one or more POS systems;

detecting, by the receipt database server from the graphical user-interface of the mobile device of the customer, the characters of the at least one search term having been detected at the input user-interface control of a search engine at the mobile device;

after receiving a selection of an activation user-interface control, transmitting the at least one search term to a receipt matching system, wherein the at least one search term is matched to a particular receipt item retrieved from one or more of each digital receipt of the one or more digital receipts that list the particular receipt item, wherein one or more receipt items comprise the particular receipt item; and receiving, by the receipt database server, a list of receipt items comprising the particular receipt item from the one or more digital receipts that matches the one or more application identifiers mapped to the mobile device of the customer, wherein the list of receipt items identifying the particular receipt item corresponds to the characters of the at least one search term, as completely entered, wherein the receipt database server communicates with an advertisement system;

at the advertisement system prior to receiving the selection of the input activation user-interface control:

sequentially receiving, by the receipt database server, the characters of the at least one search term by the input user-interface control;

prior to detecting receipt of any additional characters of the at least one search term at the input user-interface control, the characters of the at least one search term having been automatically and without further customer intervention, transmitting to the advertisement system the characters of the at least one search term and the application identifier of the one or more application identifiers mapped to the mobile device upon detection at the input user-interface control, the search engine searching the content of the one or more digital receipts retrieved from the receipt database server located apart from the mobile device, wherein (a) the characters of the at least one search term are matched to the one or more advertisements from the advertisement system based on the content of the one or more digital receipts of the customer, and (b) the application identifier mapped to the mobile device identifies the mobile device to the advertisement system;

verifying, by the advertisement system, a digital receipt of the one or more digital receipts that corresponds to the one or more advertisements and to the application identifier;

retrieving, by the advertisement system, the digital receipt from the receipt database server storing the one or more digital receipts of the customer received from one or more businesses;

searching, by the advertisement system, the each digital receipt of the one or more digital receipts for the products previously purchased in association with the mobile device that correspond to the one or more advertisements that match the characters of the at least one search term;

responsive to the searching of the each digital receipt for the products previously purchased, accessing, by the advertisement system, an advertisement repository that comprises the one or more advertisements, the one or more advertisements advertising items offered for sale; and selecting, by the advertisement system, the one or more advertisements from the advertisement repository, the one or more advertisements advertising items offered for sale by the one or more businesses, the one or more advertisements according to selection criteria based on:
the characters of the at least one search term;
the list of receipt items; and
the products similar or related to the list of receipt items;

returning, by the advertisement system, the one or more advertisements, as selected, for display on the graphical user-interface of the mobile device of the customer, including using the application identifier to identify the mobile device as a recipient for the one or more advertisements, prior to receiving the selection of the activation user-interface control, wherein the advertisement system communicates with the mobile device of the customer; and displaying by the receipt database server, the particular receipt item of the list of receipt items and a date of purchase of the particular receipt item identifying one or more of the products that correspond to the characters of the at least one search term, as completely entered, with the one or more advertisements previously returned on the graphical user-interface on the mobile device of the customer.

9. The method of claim 8, wherein, the particular receipt item of the one or more receipt items has an item name, item identifier, an item price, an item department, and an item date of purchase.

10. The method of claim 8, wherein receiving, by the receipt database server, the characters of the at least one search term and the application identifier mapped to the mobile device comprises receiving a single character from the mobile device; and
wherein selecting the one or more advertisements from the advertisement repository according to the selection criteria based on the characters of the at least one search term comprises selecting advertisements for one or more items, each of the one or more items having the single character of the at least one search term as a first letter of an item name for the each of the one or more items.

11. The method of claim 8, wherein receiving, by the receipt database server, the characters of the at least one search term and the application identifier from the mobile device comprises receiving a first character and a second character of the at least one search term from the mobile device; and wherein selecting the one or more advertisements from the advertisement repository according to the selection criteria based on the characters of the at least one search term comprises selecting advertisements for one or more items, each of the one or more items having the first character and the second characters of the at least one search term as a first letter and a second letter, respectively, of an item name for the each of the one or more items.

12. A system, the system comprising:
one or more processors;
system memory;
an advertisement database, the advertisement database comprising one or more advertisements, the one or more advertisements advertising items offered for sale;
a receipts database, the receipts database containing one or more digital receipts for one or more customers of an entity, each digital receipt containing one or more receipt items; and
one or more computer storage devices having stored thereon computer-executable instructions representing a search engine, the search engine configured to:
receiving a request to search content of the one or more digital receipts from a mobile device of a customer;
searching the one or more digital receipts for products previously purchased in association with the mobile device, by using one or more application identifiers mapping one or more of the one or more digital receipts to corresponding mobile devices, wherein the products correspond to the one or more advertisements that match characters of at least one search term, wherein the one or more application identifiers are received from one or more Point of Sale ("POS") systems, wherein a receipt database server communicates with the one or more POS systems;
sequentially receiving the characters of the at least one search term at an input user-interface control of the mobile device of the customer until the at least one search term is completed;
detecting that the characters of the at least one search term have been received at the input user-interface control;
after receiving a selection of an activation user-interface control, transmit the at least one search term to a receipt matching system, wherein the at least one search term is matched to a particular receipt item retrieved from one or more of the each digital receipt of the one or more digital receipts that list the particular receipt item, wherein the one or more receipt items comprise the particular receipt item; and
receiving a list of receipt items comprising the particular receipt item from the one or more digital receipts that matches the one or more application identifiers mapped to the mobile device of the customer, wherein the list of receipt items identifying the particular receipt item corresponds to the characters of the at least one search term, as completely entered, wherein the receipt database server communicates with an advertisement system;
prior to receiving the selection of the activation user-interface control from the mobile device:
sequentially receive the characters of the at least one search term at the input user-interface control;
prior to detecting receipt of any additional characters of the at least one search term at the input user-interface control and automatically and without further customer intervention, transmit the characters of the at least one search term and an application identifier of the one or more application identifiers mapped to the mobile device, wherein, (a) the characters of the at least one search term are matched to the one or more advertisements from the advertisement system based on the content of the one or more digital receipts of the customer, and (b) the application identifier mapped to the mobile device identifies the mobile device to the advertisement system;

verifying the each digital receipt of the one or more digital receipts that corresponds to the one or more advertisements and to the application identifier;

retrieving the each digital receipt from the receipt database server storing the one or more digital receipts of the customer; and searching the each digital receipt for the products previously purchased in association with the mobile device that correspond to the one or more advertisements that match the characters of the at least one search term;

responsive to the searching of the each digital receipt for the products previously purchased, receive the one or more advertisements advertising the items offered for sale, wherein the one or more advertisements are selected based on:
 the characters of the at least one search term;
 the list of receipt items; and
 the products similar or related to the list of receipt items;

coordinate presenting the one or more advertisements on a graphical user-interface of the mobile device of the customer prior to receiving the selection of the activation user-interface control, wherein the advertisement system communicates with the mobile device of the customer; and displaying by the receipt database server, the particular receipt item of the list of receipt items and a date of purchase of the particular receipt item identifying one or more of the products that correspond to the characters of the at least one search term, as completely entered, with the one or more advertisements previously presented on the graphical user-interface of the mobile device of the customer.

13. The system of claim 12, wherein the one or more computer storage devices have further stored thereon the computer-executable instructions representing the advertisement system, the advertisement system configured to:
 receiving the characters of the at least one search term and the application identifier from the mobile device;
 accessing the advertisement database;
 selecting the one or more advertisements from the advertisement database according to selection criteria based on the characters of the at least one search term; and
 return the one or more advertisements, as selected, to the search engine, returning the one or more advertisements including using the application identifier mapped to the mobile device to identify the mobile device as a recipient for the one or more advertisements.

14. The system of claim 12, wherein, the particular receipt item of the list of receipt items has an item name, an item identifier, an item price, an item department, and an item date of purchase.

15. The system of claim 12, wherein to receive the characters of the at least one search term comprises to receive a single character of the at least one search term; and
 wherein to detect that the characters of the at least one search term have been received at the input user-interface control comprises to detect that the single character of the at least one search term has been received at the input user-interface control.

16. The system of claim 15, wherein to receive the one or more advertisements from the advertisement system comprises to receive each advertisement in the one or more advertisements associated with a product name having the single character of the at least one search term as a first letter of the product name.

17. The system of claim 12, wherein to receive the characters of the at least one search term comprises to receive a first character and a second character of the at least one search term; and
 wherein to detect that the characters of the at least one search term have been received at the input user-interface control comprises to detect that the first character and the second character of the at least one search term have been received at the input user-interface control.

18. The system of claim 12, further comprising the search engine being configured to transmit the characters of the at least one search term and the application identifier from the mobile device to the advertisement system comprises the search engine being configured to transmit the first character and the second character of the at least one search term to the advertisement system; and
 wherein the search engine being configured to receive the one or more advertisements from the advertisement system comprises the search engine being configured to receive each advertisement in the one or more advertisements associated with a product name having the first character and the second character of the at least one search term as a first letter and a second letter respectively.

19. The system of claim 12, further comprising the search engine being configured to:
 subsequent to receiving the characters of the at least one search term, receiving additional characters of the at least one search term, wherein receiving the selection of the activation user-interface control occurs after receiving the additional characters of the at least one search term;
 in response to receiving the selection of the activation user-interface control, submitting the characters of the at least one search term and the additional characters of the at least one search term together to the receipts database;
 receiving the list of receipt items from the receipts database located in the advertisement system, the one or more receipt items corresponding to the at least one search term; and
 presenting the one or more receipt items along with the one or more advertisements on the graphical user-interface of the mobile device.

20. The method of claim 8, wherein transmitting by the receipt database server, the characters of the at least one search term and the application identifier from the mobile device to the advertisement system further comprises transmitting a single character of the at least one search term to the advertisement system; and
 wherein receiving the one or more advertisements from the advertisement system comprises receiving each advertisement included in the one or more advertisements associated with a product name having the single character of the at least one search term as a first letter of the product name.

\* \* \* \* \*